Patented Feb. 28, 1950

2,498,735

UNITED STATES PATENT OFFICE 2,498,735

ELECTRONIC AGING OF ALCOHOLIC BEVERAGES

Arno Brasch, Brooklyn, N. Y., assignor, by mesne assignments, to Electronized Chemicals Corporation, New York, N. Y., a corporation of Delaware No Drawing. Application December 26, 1947, Serial No. 794,433

17 Claims. (Cl. 99—48)

This application is a continuation-in-part of my U. S. patent applications Serial No. 442,138, filed May 7, 1942, for Method for treatment of matters, now abandoned; Serial No. 450,923, filed July 14, 1942, for Method and means for treatment of perishable substances and products so obtained, now abandoned; Serial No. 451,370, filed July 17, 1942, for Method and means for treatment of vegetative substances and products so obtained, now abandoned; Serial No. 700,167, filed September 28, 1946, for Method of sterilizing and preserving, now Patent No. 2,456,909, issued December 21, 1948.

My present invention relates to methods of aging and otherwise improving alcoholic beverages.

It is an object of my present invention to considerably reduce the time needed for aging alcoholic beverages.

It is a further object of my present invention to carry out aging of alcoholic beverages within a few weeks instead of one to four years necessary for the presently used aging processes.

It is also an object of my present invention to influence the fermentation of alcoholic beverages by destroying undesirable wild yeasts, molds, fungi and similar fermentation agents previous to subsequent fermentation with a defined pure strain of yeast of the desired type.

It is furthermore an object of my present invention to accelerate the clearing of alcoholic beverages after production of the same by causing rapid agglutination of particles suspended therein.

Still another object of my present invention consists in imparting to beer a ripe mellow flavor within a few days.

Finally, it is also an object of my present invention to increase the alcoholic content of alcoholic beverages made from juices of low sugar content.

With the above objects in view, my present invention mainly consists in treating alcoholic beverages with high speed electrons having a substantial penetration range.

In order to attain the objects of my present invention, i. e. in order to age the alcoholic beverages and to improve them otherwise as set forth above, it is of particular advantage to use high speed electrons, particularly high speed electrons of a velocity equivalent to more than one million volts.

I have found that by irradiating alcoholic beverages, such as wines, brandies, whiskeys and the like, I am able to age them within a matter of weeks instead of the years needed at the present time. This is probably due to the accelerating effect of the electrons upon the enzymes present in the irradiated alcoholic beverages.

It is also possible that the electron bombardment proposed by me results in a chain reaction upon the carbonates present in the alcoholic beverages whereby the carbon dioxide concentration of the same is increased and their pH is changed.

At any event, tests carried out by me proved that my new methods make it possible to age alcoholic beverages and to impart to the same the desired mellow or ripe taste the attainment of which has up to date required the undisturbed storage of the alcoholic beverages for many years.

It is also possible by my new methods to obtain any desired stage of aging or ripeness by terminating irradiation at the proper moment in accordance with the stage of ripeness or aging desired.

I have also found that I am able to direct the fermentation of alcoholic beverage by irradiating the fruit juices before fermentation in such a manner as to entirely destroy and thus eliminate wild yeasts, moulds, fungi and other fermentation agents initially present in the juices. To the thus treated juices I then add for fermentation purposes a pure strain of yeast, having the desired effect, and cause fermentation of the juices by this particular yeast.

I have also found that by irradiating alcoholic beverages after fermentation in the manner proposed by me with high speed electrons, it is possible to cause rapid agglutination of suspended matter and thereby to clear the produced alcoholic beverages within a very short time.

I have also found that in the case of beer bombardment with high speed electrons causes not only a great reduction of the time needed for aging, but also causes a ripe mellow flavor in the irradiated beer within a few days after irradiation.

With my new methods, it is possible to increase the alcoholic content of alcoholic beverages, particularly of wine made from juices having a low sugar content. In this case, I irradiate the unfermented fruit juices, e. g. grape juice, before fermentation causing breakdown of starches present in the fruit juice and transformation of the same into fermentable particles, thus increasing the percentage of juice particles transformable into alcohol during the fermentation process.

I have found that by this method I am able to obtain from juices, which would by normal methods be transformable only into wines of an alcoholic content of less than 11%, alcoholic beverages having an alcoholic content of between 14 and 20%.

It should be noted that by my new method I am able to increase the effervescence, i. e. the amount of carbon dioxide of wines having a considerable acid content. This is due to the fact that electron bombardment carried out in the manner proposed by me results in decarboxylation of the acids, particularly of the tartaric acid present in such wines. Such a process is particularly important for red wines which are usually rather sour because the decrease of acid content also results in a sweetening of the obtained wine product.

I have found that most of my above described processes are accompanied by an increase of glycerol formation, thus giving fuller body to the various alcoholic beverages treated as proposed by me. This is due to the partial inhibition of enzymes which otherwise would cause fermentation without sufficient glycerol formation.

Although my new processes described above can be carried out in many different ways with excellent results, I noticed that by bombarding certain alcoholic beverages for a considerable time with high speed electrons certain changes in taste, odor, and appearance were caused.

I have found that these changes are caused by certain side reactions which consist mainly in creation of hydrogen peroxide, ozone, denaturation of the proteins present in certain alcoholic beverages, and hydrolysis of certain electron bombarded alcoholic beverages.

I have found that the side reactions mentioned in the preceding paragraph are mainly due to the interactions of the electrons with the atmosphere surrounding the electron bombarded alcoholic beverages and the reactive compounds within these alcoholic beverages, to the production of heat and other related factors, and not due to the action of the high speed electrons proper.

I have also found that these side reactions can be reduced by shortening the time periods during which the alcoholic beverages are irradiated. Therefore, processes according to my present invention mainly consist in irradiating the alcoholic beverages with high speed electrons during one or more extremely short time periods. Such reduction of the length of the single irradiation periods results in reduction or avoidance of the above listed undesired side reactions.

Furthermore, it is often important to avoid creation of heat in the irradiated alcoholic beverages; this object is also attained by reducing the length of the single irradiation periods.

I have obtained very good results by using for aging purposes high speed electrons of a velocity equivalent to more than two, preferably, more than four million volts; excellent results were obtained by use of high speed electrons of a velocity equivalent to about six million volts.

Furthermore, I have found it advisable to reduce the single irradiation periods to less than $10^{-4}$, preferably to about $10^{-6}$ of a second. In some cases, it will even be indicated to use irradiation periods each lasting $10^{-7}$ of a second, or less.

I wish to emphasize that the short duration of the single irradiation periods does not change the aging effect of such irradiations on the alcoholic beverages; I found that such short irradiations have the desired aging effect without the side reactions mentioned above.

Thus, it is evident that the length of each of the single irradiation periods is of minor importance from the point of view of aging of the alcoholic beverages, but that only the total length of the irradiation periods together decides the irradiation effect.

Therefore, in order to obtain aging optimal effects, I propose, in accordance with my present invention, to irradiate the alcoholic beverages to be aged with high speed electrons during a series of consecutive short time periods.

Preferably, the high speed electrons have a velocity equivalent to more than four million volts, e. g. about six million volts, and the irradiation periods have each a length of less than $10^{-4}$ of a second, e. g. of about $10^{-6}$ of a second.

I may use for my new processes described above different types of devices for creating high speed electrons and also the most differently constructed and shaped irradiation chambers. However, I have found that the devices described in my U. S. Patents Nos. 2,043,733 and 2,099,327 are very well adapted and the most efficient ones for the purposes of my present invention. Thus, while any source of radiation can be used for the production of high speed electrons, my so-called condenser method which generates electric impulses of very short duration and great intensity by use of a laminated discharge tube proved most satisfactory. This method consists in using a plurality of condenser units, the number of which is selected according to the voltage required, charging these condenser units in parallel over charging resistances and discharging them by means of discharge spark gaps in series whereby the voltage is multiplied in accordance with the number of condenser units employed and in accordance with the voltage with which each of the individual condenser units has been charged.

This high voltage, which is at least one million volts, preferably however four or more million volts, is conducted to the cathode of a laminated discharge tube also described in my above mentioned U. S. patents. A discharge tube of this type is adapted to create high speed electrons having the required high velocity and adapted for the aging processes described above.

Although my above described processes are effective for a great variety of alcoholic beverages to be aged, it is rather difficult to obtain satisfactory results with certain alcoholic beverages. Thus, it is not always possible, by increase of the speed of the bombarding electrons and decrease of the length of the single irradiation periods, to avoid entirely certain of the above listed side effects, namely the creation of hydrogen peroxide, ozone and nitrous oxides, and the denaturation of proteins contained in some alcoholic beverages. Furthermore, during irradiation of certain alcoholic beverages, additional side reactions occur which cannot be eliminated by the raise of the velocity of the bombarding electrons and by reduction of the length of the single irradiation periods. Such unaffected side reactions are mainly the destruction of the natural coloring matters in the irradiated alcoholic beverages, particularly the destruction of hemoglobin, chlorophylls and carotinoids present in some of the irradiated alcoholic beverages.

I have found that the side reactions listed in the preceding paragraph can be greatly reduced and in most cases completely avoided by cooling these alcoholic beverages which are affected by such side reactions to a low temperature and irradiating the thus cooled alcoholic beverages in the manner described above.

The degree of cooling depends on the character of the single products to be irradiated: Good results were already obtained by cooling to a temperature of 0° C.; the results were, however, better if the alcoholic beverages were cooled to a temperature of —20° C., or less, and irradiated at such a low temperature.

Tests proved that by first cooling the alcoholic beverages to be aged to the low temperatures mentioned above and then subjecting the thus cooled alcoholic beverages to a series of very short irradiations by high speed electrons, it is possible to age the alcoholic beverages without noticeable change in appearance, taste and odor.

Generally, I have found that the combination of the three factors mentioned above, namely high speed electrons irradiation, a series of very short irradiation periods, and cooling to a low temperature, not only suppresses oxidation, but also avoids all other above discussed side effects, leaving only the most rapidly occurring chemical and biological reactions unaffected.

It should be mentioned that during irradiation of some types of alcoholic beverages with high speed electrons, certain side reactions occur which can hardly be avoided by any of my new processes defined above. This holds true, particularly, for alcoholic beverages which are highly unstable to oxidation. Cooling to very deep temperatures and very short irradiation periods, as proposed above, are insufficient to avoid oxidation of such alcoholic beverages during irradiation.

I have found it advisable to irradiate alcoholic beverages of the type defined in the preceding paragraph in accordance with my present invention in the absence of oxidizing agents, e. g. in an atmosphere having an oxygen concentration which is reduced to such a degree that the amount of oxygen molecules present is insufficient to react during irradiation with the irradiated alcoholic beverages. Such reduction of the oxygen concentration can be attained by use of an inert gaseous atmosphere, or by use of partial vacuum.

I have found that in order to attain good results, it is advisable to place some types of alcoholic beverages to be treated in sealed containers and to irradiate the alcoholic beverages while they are sealed in such containers. Of course, as set forth above, these containers should contain only very little or no oxygen at all so as to prevent oxidation of the irradiated alcoholic beverages.

In accordance with my present invention, aging of alcoholic beverages is preferably carried out in the following way:

First, the alcoholic beverage to be aged is placed into a container from which the air is removed, either by introduction of an inert gas or by evacuating the container.

After the alcoholic beverage to be aged is placed into the container and the air removed therefrom as described above, the container is airtightly sealed.

Thereafter, the container together with the alcoholic beverage to be irradiated is cooled to between 0° C. and —20° C., depending upon the type of alcoholic beverage.

The thus cooled container and alcoholic beverage to be irradiated are then subjected to irradiation with high speed electrons having a velocity equivalent to between three and six million volts during a series of consecutive very short time periods, each lasting between $10^{-4}$ and $10^{-6}$ of a second.

I have carried out various tests and found that various alcoholic beverage have to be treated under various conditions. Thus, some of my tests were carried out at low temperatures, i. e., the various products were cooled before irradiation. Some of the tests were carried out in an inert preferably gaseous atmosphere, some were carried out in a partial vacuum, and some were carried out under pressure, e. g. gas pressure. I have also found that in some cases, it is preferable to carry out the bombardment with high speed electrons while the alcoholic beverages are at an elevated temperature. It was also found that in some other cases, reduction of the temperature and avoidance of oxidizing substances greatly improved the aging effects by preventing undesired side reactions.

It will be understood that each of the elements described above, or two or more together, may also find a useful application in other types of processes differing from the processes described above.

While I have described the invention as embodied in processes for aging alcoholic beverages, I do not intend to be limited to the details shown, since various modifications and changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. Method of aging and otherwise improving an alcoholic beverage, without developing harmful side effects by bombarding the same with high speed electrons of a velocity equivalent to more than one million volts during at least one very short time period lasting less than $10^{-4}$ of a second.

2. Method of aging and otherwise improving an alcoholic beverage, without developing harmful side effects by bombarding the same repeatedly with high speed electrons of a velocity equivalent to more than one million volts during consecutive very short time periods each lasting less than $10^{-4}$ of a second.

3. Method of aging and otherwise improving an alcoholic beverage, without developing harmful side effects comprising the steps of cooling the same to a temperature below 0° C; and bombarding the thus cooled beverage with high speed electrons of a velocity equivalent to more than one million volts during at least one very short time period lasting less than $10^{-4}$ of a second.

4. Method of aging and otherwise improving an alcoholic beverage, without developing harmful side effects comprising the steps of cooling the same to a temperture below 0° C; and bombarding the thus cooled beverage with high speed electrons of a velocity equivalent to more than one million volts during consecutive very short time periods each lasting less than $10^{-4}$ of a second.

5. Method of aging and otherwise improving an alcoholic beverage, without developing harmful side effects comprising the steps of cooling the same to a temperature of below —50° C.; and bombarding the thus cooled beverage with high speed electrons of a velocity equivalent to more than one million volts during at least one very short time period lasting less than $10^{-4}$ of a second.

6. Method of aging and otherwise improving an alcoholic beverage, without developing harmful side effects by bombarding the same with high speed electrons of a velocity equivalent to more than one million volts during at least one very short time period lasting less than $10^{-4}$ of a second; and excluding during such electron bombardment oxidizing agents from the bombarded beverage.

7. Method of aging and otherwise improving an alcoholic beverage, without developing harmful side effects by bombarding the same repeatedly with high speed electrons of a velocity equivalent to more than one million volts during consecutive very short time periods each lasting less than $10^{-4}$ of a second; and excluding during such electron bombardment oxidizing agents from the bombarded beverage.

8. Method of aging and otherwise improving an alcoholic beverage, without developing harmful side effects by bombarding the same in an inert gaseous atmosphere with high speed electrons of a velocity equivalent to more than one million volts during at least one very short time period lasting less than $10^{-4}$ of a second.

9. Method of aging and otherwise improving an alcoholic beverage, without developing harmful side effects by bombarding the same repeatedly in a partial vacuum with high speed electrons of a velocity equivalent to more than one million volts during consecutive very short time periods each lasting less than $10^{-4}$ of a second.

10. Method of aging and otherwise improving an alcoholic beverage, without developing harmful side effects by bombarding the same in a substantially oxygen free atmosphere with high speed electrons of a velocity equivalent to more than one million volts during at least one very short time period lasting less than $10^{-4}$ of a second.

11. Method of aging and otherwise improving an alcoholic beverage, without developing harmful side effects comprising the steps of cooling the same to a temperature below 0° C.; and bombarding the thus cooled beverage in a substantially oxygen free atmosphere with high speed electrons of a velocity equivalent to more than one million volts during at least one very short time period lasting less than $10^{-4}$ of a second.

12. Method of aging and otherwise improving an alcoholic beverage, without developing harmful side effects comprising the steps of placing said beverage into a container; air-tightly closing said container; and bombarding said beverage air-tightly enclosed in said container with high speed electrons of a velocity equivalent to more than one million volts during at least one very short time period lasting less than $10^{-4}$ of a second.

13. Method of aging and otherwise improving an alcoholic beverage, without developing harmful side effects comprising the steps of placing said beverage into a container; air-tightly closing said container; and bombarding said beverage air-tightly enclosed in said container with high speed electrons of a velocity equivalent to more than one million volts during consecutive very short time periods each lasting less than $10^{-4}$ of a second.

14. Method of aging and otherwise improving an alcoholic beverage, without developing harmful side effects comprising the steps of placing said beverage into a container; air-tightly closing said container; cooling said beverage air-tightly enclosed in said container to a temperature below 0° C.; and bombarding said cooled beverage air-tightly enclosed in said container with high speed electrons of a velocity equivalent to more than one million volts during at least one very short time period lasting less than $10^{-4}$ of a second.

15. Method of aging and otherwise improving an alcoholic beverage, without developing harmful side effects comprising the steps of placing said beverage into a container; air-tightly closing said container; cooling said beverage air-tightly enclosed in said container to a temperature below 0° C.; and bombarding said cooled beverage air-tightly enclosed in said container with high speed electrons of a velocity equivalent to more than one million volts during consecutive very short time periods each lasting less than $10^{-4}$ of a second.

16. Method of aging and otherwise improving an alcoholic beverage, without developing harmful side effects comprising the steps of placing said beverage into a container; removing air contained in said container; air-tightly closing said container; and bombarding said beverage air-tightly enclosed in said container with high speed electrons of a velocity equivalent to more than one million volts during at least one very short time period lasting less than $10^{-4}$ of a second.

17. Method of aging and otherwise improving an alcoholic beverage, without developing harmful side effects comprising the steps of placing said beverage into a container; removing air contained in said container; air-tightly closing said container; and bombarding said beverage air-tightly enclosed in said container with high speed electrons of a velocity equivalent to more than one million volts during consecutive very short time periods each lasting less than $10^{-4}$ of a second.

ARNO BRASCH.

REFERENCES CITED

The following references are of record in the file of this patent:

UNITED STATES PATENTS

| Number | Name | Date |
| --- | --- | --- |
| 855,449 | Dorn | June 4, 1907 |
| 1,275,417 | Gillet | Aug. 13, 1918 |
| 1,906,402 | Newton | May 2, 1933 |
| 1,907,507 | Coolidge | May 9, 1933 |
| 1,952,588 | Golden | Mar. 27, 1934 |
| 2,007,765 | Knudson | July 2, 1935 |
| 2,018,599 | Brasch | Oct. 22, 1935 |
| 2,043,733 | Brasch | June 9, 1936 |
| 2,061,960 | Coffmann et al. | Nov. 24, 1936 |
| 2,099,327 | Brasch | Nov. 16, 1937 |
| 2,122,741 | Haddad | July 5, 1938 |
| 2,161,985 | Szilard | June 13, 1939 |
| 2,456,909 | Brasch | Dec. 21, 1948 |

FOREIGN PATENTS

| Number | Country | Date |
| --- | --- | --- |
| 154,213 | Great Britain | Apr. 24, 1922 |
| 190,512 | Great Britain | Dec. 8, 1922 |
| 299,735 | Great Britain | Oct. 20, 1928 |
| 440,023 | Great Britain | Dec. 12, 1935 |